Dec. 30, 1969 T. S. BOSICO 3,486,623
METHOD AND APPARATUS FOR FILTERING FLUIDS
Filed April 29, 1968 3 Sheets-Sheet 1

INVENTOR:
TONY S. BOSICO
BY Howson & Howson
ATTYS.

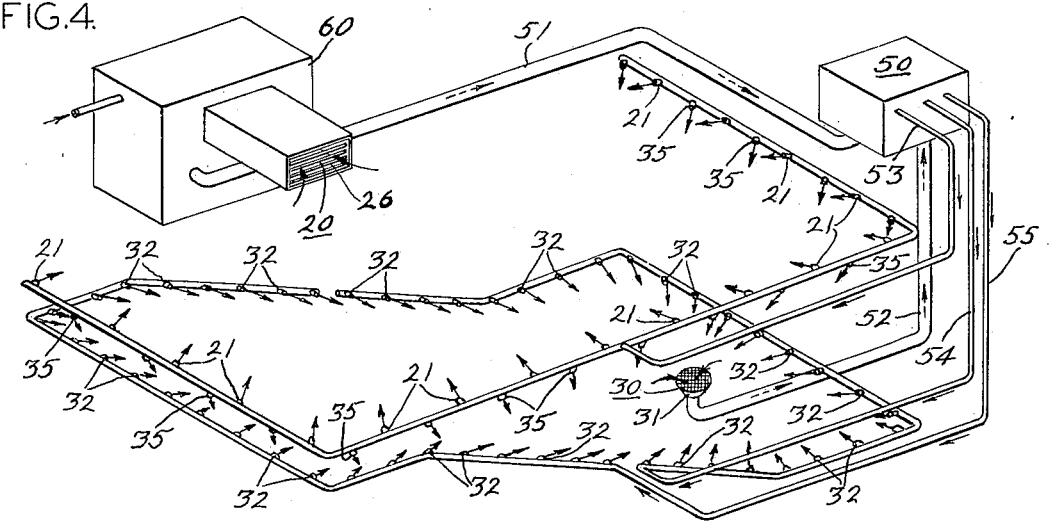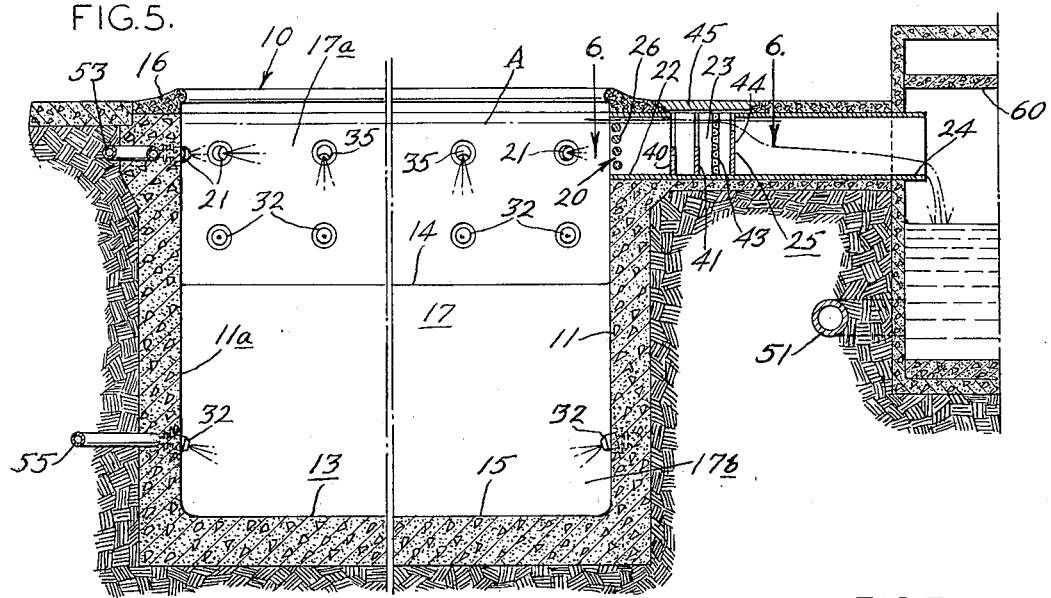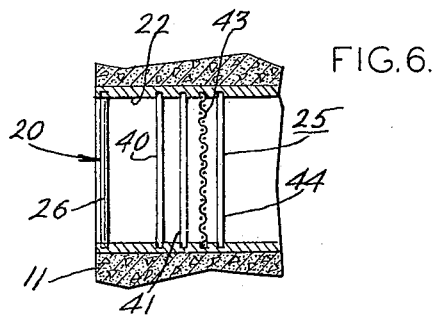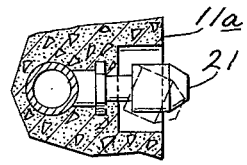

Dec. 30, 1969     T. S. BOSICO     3,486,623

METHOD AND APPARATUS FOR FILTERING FLUIDS

Filed April 29, 1968     3 Sheets-Sheet 3

INVENTOR:
TONY S. BOSICO
BY Howson & Howson
ATTYS.

United States Patent Office 3,486,623
Patented Dec. 30, 1969

3,486,623
METHOD AND APPARATUS FOR FILTERING FLUIDS
Tony S. Bosico, N. Line St., R.D. 1, Lansdale, Pa. 19446
Filed Apr. 29, 1968, Ser. No. 724,738
Int. Cl. E04h 3/20, 3/16
U.S. Cl. 210—169                 3 Claims

ABSTRACT OF THE DISCLOSURE

A swimming pool having an outlet in one wall is provided with an upper series of nozzles disposed along the other walls below the water level in the pool to issue streams of water therefrom toward the outlet for producing an upper stratum of water flowing toward the outlet. A drain is provided in the deep end of the pool, and a lower series of nozzles are disposed along the lower margin of the walls to issue streams of fluid toward the drain for producing a lower stratum of water flowing toward the drain. Floating debris is removed from the pool by the upper stratum of water, and settling debris is removed from the pool by the lower stratum of water. The floating and settling debris is filtered from the water by recirculating-filter means.

---

The present invention relates to a method and apparatus for filtering debris from a body of fluid, and more particularly, the present invention relates to an improved method and apparatus for filtering the water in swimming pools.

At present, swimming pools are equipped with recirculating-type filtering systems having filter beds of finely-crushed stone or sand through which water is continuously circulated. Foreign matter or debris suspended in the water drawn from the pool is deposited in the filter beds, and the filter beds are periodically cleaned by backwashing the beds with reversely flowing clean water to remove the deposited debris.

Foreign matter which is not suspended in the water may be classified as either floating or settling debris, depending upon its density. Settling debris comprises dense material such as soil and sand or the like, and floating debris comprises leaves, hair, bird feathers and other matter of low density. For filtration purposes, floating debris is the most undesirable because of its proclivity to rapidly clog the filter beds, making frequency backwashing of the filter beds necessary; however, the settling debris also clogs the filter beds but at a slower rate.

Heretofore, debris which has settled to the bottom of the pool has been removed by vacuum-cleaning apparatus, which in addition to being costly, requires an operator and a considerable amount of the operator's time to thoroughly clean the pool. Floating debris which is not removed by the operator may be removed by a skimmer device provided in the pool at the water level. The effectiveness of the skimmer in removing the floating debris however, depends upon the velocity and direction of prevailing surface winds, since when the wind blows across the pool away from the skimmer, the floating debris forms an unsightly and unsanitary accumulation at a protected location remote and downwind from the skimmer.

With the foregoing in mind, it is a primary object of the present invention to provide an improved method for removing floating and settling foreign matter from a body of fluid so that the foreign matter may be effectively filtered from the fluid.

It is another object of the present invention to provide novel filtering apparatus for use in conjunction with swimming pools, which apparatus continuously removes all types of foreign matter from the swimming pool to thereby obviate the need for costly vacuum-cleaning apparatus and to eliminate the employment of an operator for operating the vacuum-cleaning apparatus.

It is a further object of the present invention to provide a unique filtering apparatus for use in conjunction with conventional swimming pool filters, which apparatus decreases the proclivity for floating foreign matter to clog the filter beds to thereby reduce the frequency with which the filter beds must be backwashed.

A still further object of the present invention is to provide an improved filtering apparatus for swimming pools, which apparatus is capable of removing floating foreign matter irrespective of the direction of prevailing surface winds to thereby improve the sanitation of the swimming pool water.

More particularly, the present invention provides an improved filtering apparatus for a swimming pool, which apparatus comprises upper outlet means provided in one wall of the swimming pool at the water level thereof and upper nozzle means provided in at least one other wall of the swimming pool for issuing water therefrom to produce an upper stratum of water flowing generally in the direction of the upper outlet means, the upper outlet means withdrawing a portion of the water in the upper stratum for filtering floating debris therefrom by recirculating-filter means. The swimming pool is also provided with lower outlet means in the bottom of the pool, and lower nozzle means is provided along the lower portion of the swimming pool walls to issue water therefrom for producing a lower stratum of water flowing generally in the direction of the lower outlet means, the lower outlet means removing a portion of the lower stratum of water for filtering settling debris therefrom by the recirculating-filter means. The upper and lower outlet means is connected to the upper and lower nozzle means by conduit means, and pumping and filtering means is connected to the conduit means for circulating and filtering the water flowing therethrough.

In addition to the foregoing objects, other objects, features and advantages of the present invention will become apparent from the following description taken in conjunction with the accompanying drawings in which:

FIG. 4 is a schematic flow diagram illustrating the direction of fluid flow from the upper and lower nozzle means to the upper and lower outlet means respectively;

FIG. 5 is a foreshortened sectional view taken along line 5—5 of FIG. 1 to illustrate the cooperation between the upper outlet means and the upper nozzle means and to particularly illustrate construction details of the upper outlet means;

FIG. 6 is a sectional view taken along line 6—6 of FIG. 5 to illustrate the baffle means used in conjunction with the upper outlet means;

FIG. 7 is an enlarged view of one of the nozzles utilized in the present invention, and illustrating the directional adjustability of the nozzle;

Figure 1:
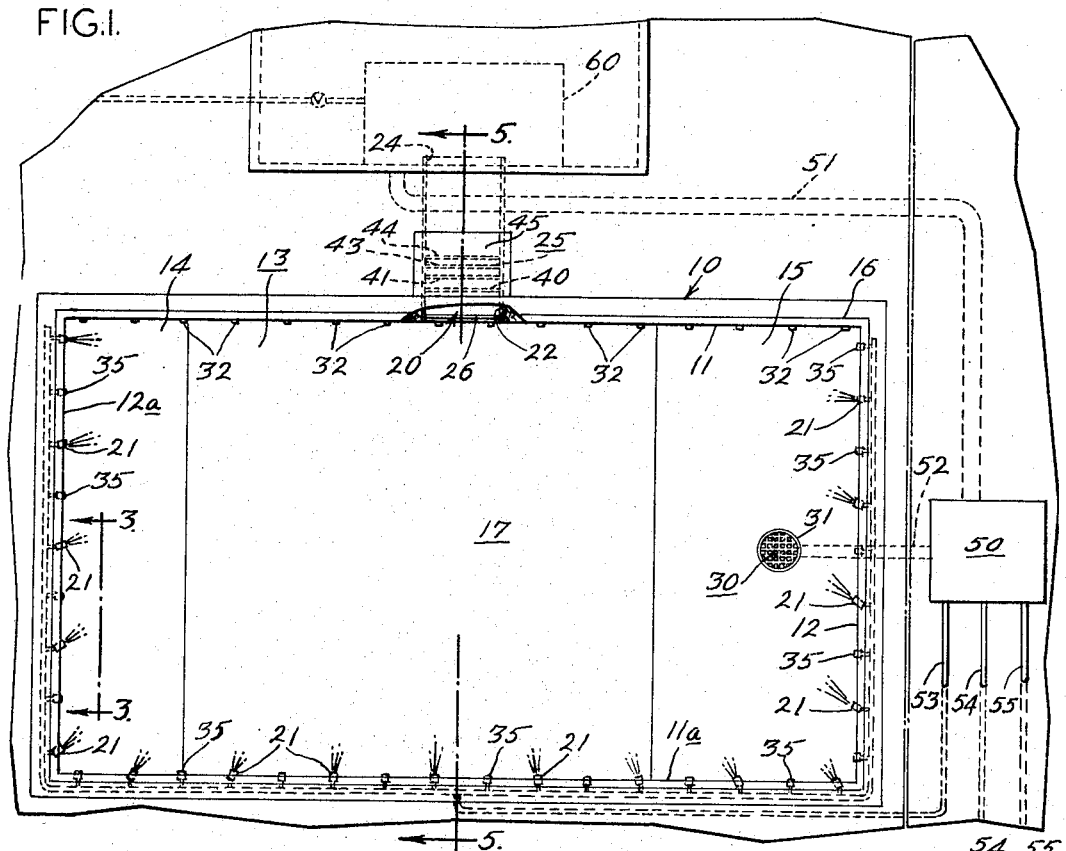
FIG. 1 is a top plan view of a swimming pool embodying the present invention.
Figure 2:
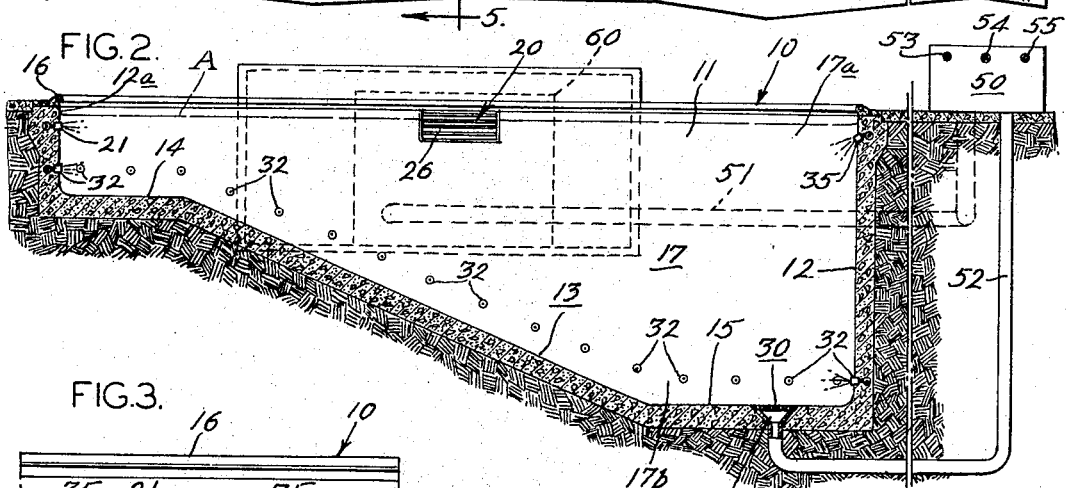
FIG. 2 is a longitudinal sectional view of the swimming pool of FIG. 1 illustrating the upper and lower nozzle means mounted in the walls thereof.
Figure 3:
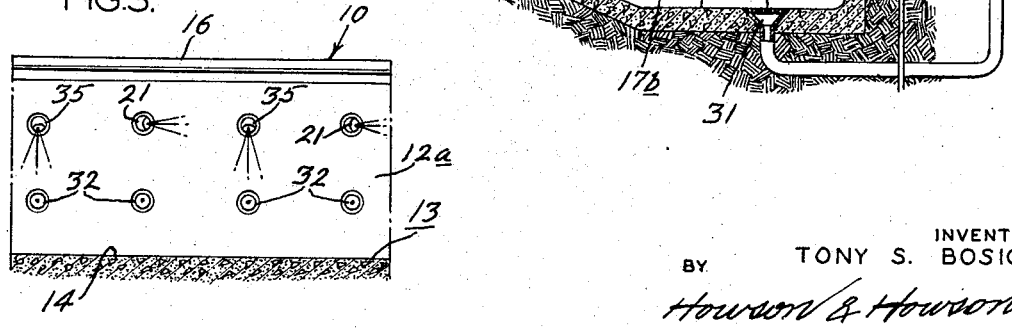
FIG. 3 is a fragmentary elevational view taken along line 3—3 of FIG. 1 to illustrate the orientation of the nozzle means in alternate downward and sideward directions.

Referring now to the drawings, FIG. 1, illustrates a swimming pool 10 having side walls 11 and 11a, end walls 12 and 12a and a bottom wall 13 disposed between the walls along the lower margin thereof to provide a shallow end 14 and a deep end 15. A trim piece or coping 16 extends along the upper marginal edge of the swimming pool walls, and the pool 10 is filled to the level indicated at A by a body of water 17 having a top layer 17a and a bottom layer 17b. The pool 10 is rectangularly-shaped; however, the rectangular configuration is exemplary only and is not to be construed as a limitation, since the present invention may be employed with equal effectiveness in pools having other shapes, such as oval, circular and kidney shapes. Furthermore, although particularly suited for use in conjunction with swimming pools, the present invention should not be limited thereto, since it may be advantageously utilized to filter debris and foreign matter from any body of water or fluid having a regular or irregular shape.

In accordance with the primary object of the present invention, a novel method and apparatus is provided for removing debris from a body of fluid, in the present instance the water 17 contained within the swimming pool 10. As noted heretofore, the debris which accumulates in the body of water 17 is of two types: debris of the floating variety which floats in the upper layer 17a, and debris of the settling variety which settles downwardly through the water 17 to the bottom layer 17b of the water. According to the present invention, removal of the floating and settling debris from the water 17 takes place in steps or stages which are clearly illustrated schematically in FIG. 8.

Figure 8:
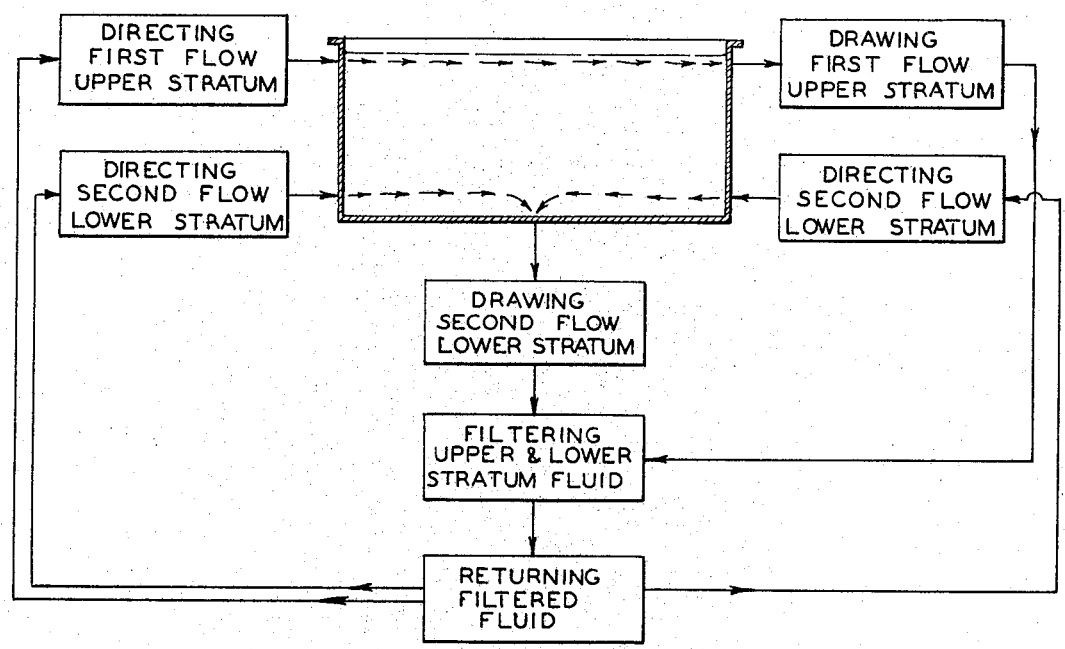
FIG. 8 is a schematic diagram illustrating the steps employed in practicing the method of the present invention.

Referring to FIG. 8, the method employed in practicing the invention comprises the steps of: directing a flow of fluid subjacent to the upper surface of the body of fluid to produce an upper stratum of fluid flowing generally toward an upper outlet zone, drawing at least a portion of the fluid in the upper stratum from the body of fluid adjacent to the upper outlet zone, directing a flow of fluid superadjacent to the bottom of the body of fluid to produce a lower stratum of fluid flowing generally toward a lower outlet zone, drawing at least a portion of the fluid in the lower stratum from the body of fluid adjacent to the lower outlet zone, filtering the fluid drawn from the body of fluid adjacent the upper and lower outlet zones, and returning the filtered fluid to the body of fluid. Furthermore, an additional step of separating debris from the fluid drawn adjacent the upper outlet zone is desirable to provide two stages of filtering for the fluid drawn from the upper stratum. In this manner, the floating debris is removed for filtering from the body of fluid by the upper stratum of flowing fluid, and the settling debris is removed for filtering from the body of fluid by the lower stratum of flowing fluid.

In accordance with the primary object of the present invention, and for the purpose of practicing the method of the present invention, novel apparatus is provided for filtering debris and foreign matter from the water 17 contained in the swimming pool 10. For the purpose of removing the floating debris from the upper layer 17a of the water, upper outlet means 20 and upper nozzle means 21 is provided. For the purpose of removing the settling debris from the lower layer 17b of the water, lower outlet means 30 and lower nozzle means 32 is provided. In addition, recirculating-filter means is connected to the upper and lower outlet means and is connected to the upper and lower nozzle means to cooperate therewith for filtering the debris from the body of water 17.

To this end, the upper outlet means 20 comprises a rectangularly shaped port 22 which is provided in one wall of the swimming pool and which extends lengthwise for a predetermined distance along the upper layer 17a of the water both above and below the surface thereof. For conventional size competition-type pools, a length of between two to four feet and a width of about one foot is adequate; however, the exact dimensions must be determined in accordance with good design practice. In the present instance, the port 22 is formed in the sidewall 11 and is centrally located between the end walls 12 and 12a. The port 22 has a recessed portion 23 which is inset from the face of the wall 11 to receive therewithin a portion of the water in the upper layer 17a. A discharge passageway 24 is provided for the recessed portion 23 remote from the face of the wall 11, and baffle means 25 is mounted in the recessed portion 23 intermediate the port 22 and the passageway 24. A conventional grating 26 is provided in the mouth of the port 22, and when the pool is filled with water to the level indicated at A, the water flows into the recessed portion 23, over the baffle means 25, and through the passageway 24. Furthermore, with this outlet arrangement an additional advantage of the present invention is realized, since, the size and location of the outlet port tends to minimize the effect of wave action on swimmers during competitive swimming events.

Floating debris which has accumulated on the surface of the water 17 is conveyed to the upper outlet means 20 by an upper stratum of water flowing toward the upper outlet means. To this end, the upper stratum of flowing water is produced by an upper series of nozzles 21 which are mounted in spaced apart relationship in the walls 11a, 12 and 12a of the swimming pool and are directionally adjustable (FIG. 7). The nozzles 21 project into the upper layer 17a when the pool is filled to the level indicated at A, and the nozzles 21 are adjusted to issue streams of water therefrom toward the upper outlet means 20 so that an upper stratum of water is flowed from the nozzles to the upper outlet means 20. The upper stratum of water flowing across the swimming pool thereby carries floating debris toward the upper outlet means 20 for collection and removal thereby.

Debris or foreign matter which has a density greater than water, and which escapes the upper stratum of flowing water, settles onto the bottom 13 of the swimming pool, and in accordance with the primary object of the present invention, apparatus is provided for removing the settling debris from the bottom 13. To this end, lower outlet means 30 is provided in the bottom wall 13 in the deep end 15 of the pool. The lower outlet means 30 comprises a funnel-shaped drain 31 substantially centrally located in the deep end 15 of the pool, and in addition to removing settling debris from the swimming pool, the drain 31 may be utilized to completely drain the water when the pool is not in use.

The settling debris is removed from the lower water layer 17b by the lower outlet means 30, and for the purpose of conveying the settling debris to the lower outlet means 30, lower nozzle means 32 is provided. The lower nozzle means 32 comprises a series of nozzles which are mounted in spaced apart relationship along the lower margin of the swimming pool walls 11, 11a, 12, and 12a in a plane parallel to the bottom wall 13. Similarly to the upper nozzle means, each nozzle 32 in the lower nozzle means is oriented with respect to the lower outlet means 30 to issue a stream of fluid therefrom in the direction of the lower outlet means. The conjoining of each of the streams of water from the nozzles thereby produces a lower stratum of water flowing in the general direction of the lower outlet means 30 to convey settling debris toward the lower outlet means for removal thereby. It has been found that, with respect to swimming pools of conventional dimensions, a spacing of about one foot from the bottom wall 13 of the pool gives excellent operating results.

According to another important feature of the present invention, means is provided to limit the accumulation of debris on the walls of the pool, and, to this end, a plurality of downwardly directed nozzles 35 are selected from the upper series of nozzles 21 to direct water downwardly along the walls of the pool toward the lower outlet means 30. The selected nozzles 35 are adjusted so that streams of water are directed in both sideward and downward directions by the upper nozzle means 21. In this manner, the walls of the swimming pool are swept clean by the water which flows downwardly therealong while the upper stratum of water which flows toward the upper outlet means is undisturbed.

As noted heretofore, baffle means 25 is provided in the recessed portion 23 of the port 22 to calm the water received therein for capturing a portion of the floating debris and assisting in controlling the flow of water through the discharge passageway 24. To this end, the baffle means 25 comprises a plurality of upstanding baffle plates 40 and 41 which register with the grating 26 in the mouth of the port 22 to permit water to flow over the plates toward the passageway 24. A weir 44 is provided for regulating the flow of water through the passageway 24 and the weir 44 is mounted between the baffle plate 41 and the passageway 24. A screen 43 is secured intermediate the baffle plate 41 and the weir 44, and cooperates with the grating 26 to remove sizable items of floating debris from the water. A cover plate 45 provides access to the baffle means 25 for cleaning and replacement purposes, and also affords convenient access for changing the elevation of the weir 44 to thereby regulate the flow of water through the discharge passageway.

The floating and settling debris which has been collected by the upper and lower outlet means respectively is filtered from the water by recirculating-filter means. The recirculating-filter means is connected to the upper outlet means for withdrawing from the pool a predetermined portion of the upper stratum of flowing water, and the recirculating-filter means is connected to the lower outlet means for withdrawing from the pool a portion of the lower stratum of flowing water. The water removed from the swimming pool by the upper and lower outlet means is circulated through filter means and is returned to the swimming pool by the upper and lower nozzle means. To this end, the recirculating-filter means comprises a pumping unit 50 (FIGS. 1, 4) in which is provided a conventional filter element (not shown) and which is in fluid communication with the upper outlet means 20 and the lower outlet means 30 through conduit means 51 and 52 respectively. Fluid communication between the pumping unit 50 and the upper nozzle means 21 and the lower nozzle means 32 is provided by conduit means 53, 54 and 55 respectively. The pumping unit 50 circulates water through the conduit means from the upper and lower outlet means to the upper and lower nozzle means, and foreign matter is removed from the circulating water by the filter element provided therein.

In order to effectively remove floating matter from the water preparatory to entering the filter element in the pumping unit, a surge or settling tank 60 (FIG. 4, 5) is provided to separate floating debris from settling debris suspended in the upper stratum. The surge tank 60 is preferably located adjacent to the upper outlet means 20 so that the passageway 24 thereof opens into the surge tank 60. The surge tank 60 is connected to the pumping unit 50 by the conduit means 51 so that water received within the upper outlet means 20 is thereby flowed over the baffle means 25, through the passageway 24, into the surge tank 60 and through the conduit means 51 to the pumping unit 50. Preferably, the conduit means 51 communicates with the settling tank 60 intermediate the top and the bottom of the tank to avoid withdrawing therefrom water which contains settled or floating debris. Since debris suspended in the water settles to the bottom of the tank while the floating debris floats thereon, the floating debris and the debris which has settled on the bottom of the tank may be periodically removed by an operator. In this manner, a considerable portion of un- desirable floating matter is removed from the water preparatory to entering the filter element in the pumping unit.

Figure 9:
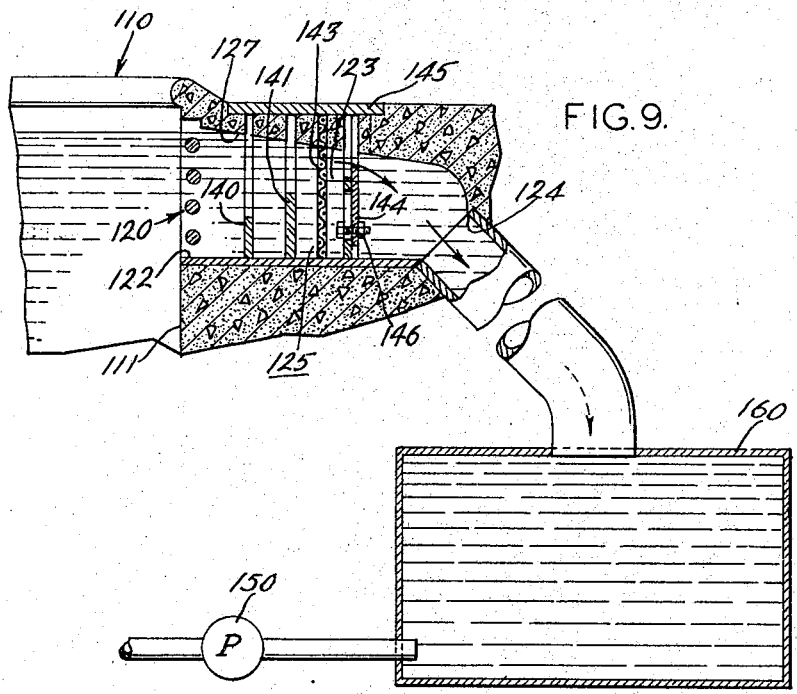
FIG. 9 is a sectional view of a modified form of upper outlet means shown schematically connected to a surge tank.

In another embodiment of the present invention, a portion of the upper stratum of water is drawn from the pool 110 (FIG. 9) by a modified upper outlet means 120 which cooperates with a surge tank 160 and a pumping unit 150 to withdraw water at a controlled rate from the upper stratum. To this end, a siphon action is employed to assist the gravitational forces in drawing the water from the pool 110. For this purpose, the modified upper outlet means 120 is provided in one wall 111 of the pool, and the upper outlet means 120 has an elongated port 122 with a recessed portion 123 inset from the face of the wall 111. A discharge passageway 124 is provided at one end of the recessed portion 123, and baffle means 125 is mounted in the recessed portion 123 intermediate the passageway 124 and the mouth of the port 122. The baffle means 125 comprises a plurality of upright baffle plates 140 and 141 and a weir 144 mounted below the surface of the water in the pool which is spaced from the baffle plate 141, a screen 143 being secured between the plate 141 and the weir 144. In addition, the weir 144 may be vertically adjusted by a slotted connection arrangement 146, an upper plate 145 providing access to the baffle means 125 for cleaning purposes and providing convenient access for adjusting the elevation of the weir 144.

In order to prevent air from being drawn through the port 120 and into the tank 160, the recessed portion 123 of the port has an upper wall 127 which tapers downwardly toward the weir 144. Thus, when the weir is adjusted to a predetermined elevation, air is prevented from entering the surge tank irrespective of fluctuations in the water level, and water from the upper stratum received within the port 122 is drawn over the weir 144 by a negative pressure induced adjacent to the passageway 124 by the water flowing downwardly into the surge tank 160. In this manner, a push-pull effect is achieved between the upper nozzle means and the upper outlet means to thereby maintain the velocity of the upper stratum of flowing water for assisting the upper stratum in conveying floating debris to the upper outlet means.

In operation, the pool 10 is filled with water to the level indicated at A, and a portion of the water flows into the upper outlet means 20, over the baffle means 25, and through the discharge passageway 24 into the surge tank 60. When the pumping means 50 is energized, streams of water flow outwardly from the upper nozzle means 21 and the lower nozzle means 32 toward the upper outlet means 20 and the lower outlet means 30 respectively. The streams of water issuing from the upper nozzle means 21 produce an upper stratum of water flowing in a general direction toward the upper outlet means 20. A portion of the water in the upper stratum is withdrawn from the pool after it has been calmed by the baffle plates 40 and 41, strained through the screen 43, and flowed over the weir 44 into the surge tank 60. A considerable portion of the debris in the upper stratum is deposited in the surge tank 60, and relatively clean water is drawn from the surge tank 60 through the conduit means 51 by the pumping means 50. In a similar manner, streams of water issuing from the lower nozzle means 32 produce a lower stratum of water flowing toward the lower outlet means 30. A portion of the lower stratum of water is drawn into the outlet means 30 and through the conduit means 52 by the pumping means 50. The upper and lower strata of fluid are filtered in the pumping unit 50, and the filtered fluid is then flowed through the conduit means 53, 54 and 55 to the upper and lower nozzle means 21 and 32 respectively to be recirculated through the pool.

In practice, it has been found desirable to control the volume of fluid flowing through the upper outlet means 20 so that it is approximately 85 percent of the total volume of fluid flowing through the recirculating-filter means. This may be effected by properly dimensioning the upper outlet means, by properly adjusting the elevation of the weir in the upper outlet means, and by regulating the operation of the pumping unit as one skilled in the art would readily perceive. In this way, the bulk of the water drawn from the pool is handled by the upper outlet means and is passed through the surge tank to thereby provide a first-stage filter for the floating material. The floating debris is thereby prevented from clogging the filter beds, and the frequency with which the filter beds must be backwashed is reduced.

Thus, from the foregoing it may be seen that the present invention provides a novel method and apparatus for continuously removing floating and settling debris from a body of fluid, so that unsanitary accumulations of floating debris may be removed therefrom irrespective of prevailing wind directions and velocities. Furthermore, the present invention now provides an improved filtering apparatus for swimming pools, which apparatus reduces the frequency with which the filter beds must be backwashed, and which apparatus obviates the need for employing costly vacuum-cleaning apparatus and an operator for cleaning the swimming pool.

While preferred embodiments of the present invention have been described in detail, various modifications, alterations and changes may be made thereto without departing from the spirit and scope of the present invention.

I claim:

1. In a swimming pool having side walls and a bottom wall and adapted to be filled with fluid to a predetermined level, the improvement comprising; upper fluid outlet means in one of said side walls to register with the surface layer of fluid at said predetermined fluid level, said upper outlet means including an elongated horizontally extending opening in said one side wall with the upper edge of said opening above said predetermined fluid level and the lower edge of said opening below said predetermined fluid level, a passageway for the flow of fluid extending through and beyond said one side wall with an initial end of said passageway coextensive with said elongated opening and a terminal end of said passageway spaced from said elongated opening, said passageway having a cross-sectional shape substantially the same as the shape of said elongated opening and extending in a generally horizontal direction, a surge tank in fluid communication with the terminal end of said passageway to receive fluid passing through said passageway, a horizontally extending weir plate within said passageway spaced intermediate said initial and terminal ends of said passageway to control the rate of flow of fluid through said passageway, said weir plate extending entirely across said passageway and projecting from the bottom surface of said passageway vertically upward toward but terminating short of said upper surface of said passageway and below said predetermined fluid level, baffle means within said passageway intermediate said weir plate and said initial end of said passageway to interrupt surges of fluid passing through the passageway before the surges of fluid reach said weir plate, and means to filter and recirculate to the swimming pool the fluid received in said surge tank.

2. Apparatus in accordance with claim 1 in which the means to filter and recirculate the fluid includes a plurality of fluid inlet means positioned in said side walls just below said predetermined fluid level and directing fluid in a direction toward said upper fluid outlet means.

3. Apparatus in accordance with claim 1 wherein said weir plate is vertically adjustable to control the rate of flow of fluid through said passageway.

References Cited

UNITED STATES PATENTS

| | | | |
|---|---|---|---|
| 2,502,052 | 3/1950 | Landon et al. | 210—169 |
| 3,045,829 | 7/1962 | Rule et al. | 210—169 |
| 3,155,989 | 11/1964 | Anderon | 210—169 X |

REUBEN FRIEDMAN, Primary Examiner

T. A. GRANGER, Assistant Examiner